April 6, 1937. F. U. NEAT 2,076,478
METHOD OF AND APPARATUS FOR DISSOLVING MATERIAL
Filed Nov. 26, 1935
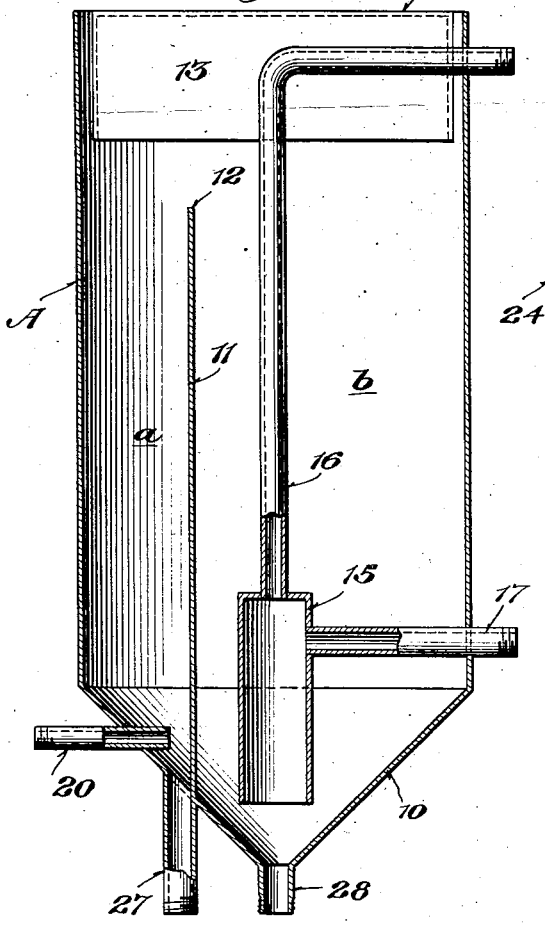
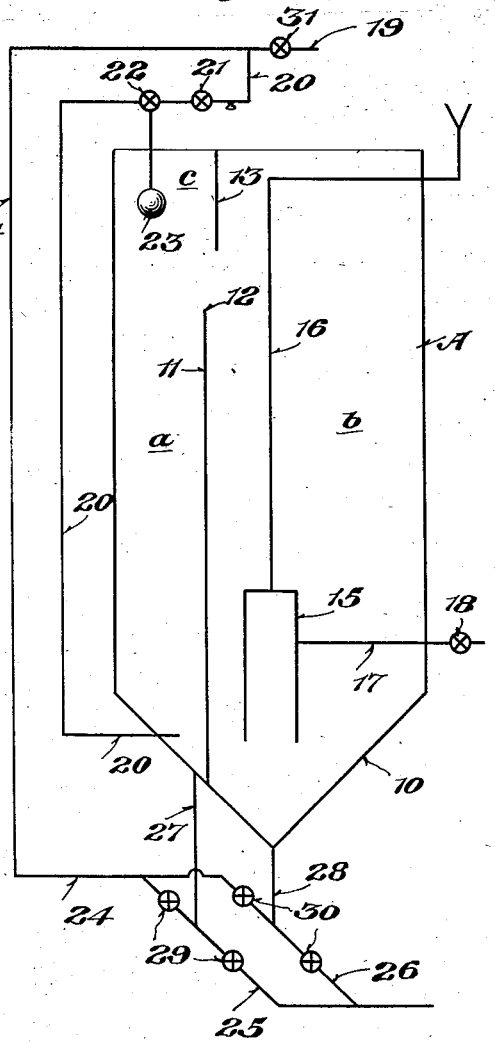
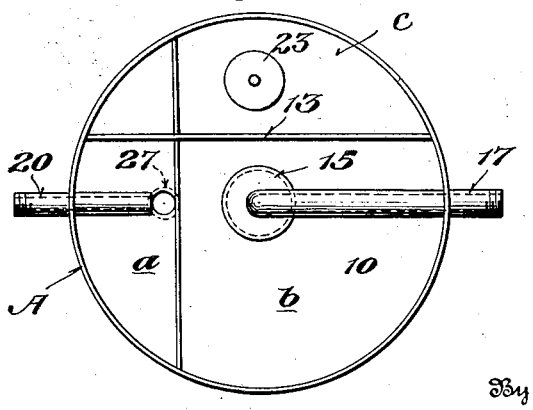
Inventor
Frank U. Neat,
By D. P. Wolhaupter
Attorney Patented Apr. 6, 1937

2,076,478

UNITED STATES PATENT OFFICE

2,076,478

METHOD OF AND APPARATUS FOR DISSOLVING MATERIAL

Frank Urbane Neat, Louisville, Ky., assignor to Jefferson Island Salt Company, Louisville, Ky., a corporation of Kentucky Application November 26, 1935, Serial No. 51,706

3 Claims. (Cl. 23—272)

This invention relates to an improved method of and apparatus for dissolving the soluble salts or other solid, soluble substances.

In various industries it often is desirable to use large quantities of salts or other substances in solution, and in most instances it is extremely desirable or essential that the solution or brine be entirely clear and free from impurities.

Ordinary halite or rock salt usually contains insoluble materials such as shale, alumina, silica, calcium and sometimes iron in varying amounts. It may also have deposited thereon other substances such as dust, soot and the like. Unless these various insoluble materials or substances are removed from the solution or brine the same may be unfit for use. The general object of the present invention is, therefore, to provide a novel method of, and apparatus for, dissolving salts or other solid, soluble substances whereby there is obtained a practically saturated solution or brine which is clear and free from impurities.

Heretofore, apparatus for dissolving salts and other substances have usually been constructed to operate either on the upward flow principle, according to which the water or other liquid passes upwardly through a body of the material to be put into solution; or on the downward flow principle according to which the water or other liquid passes downwardly through a body of the material to be put into solution. Neither of these types of apparatus has, however, proved to be entirely satisfactory in use, for in the case of upward flow types of apparatus certain impurities in the material tend to rise in and float on the surface of the brine or are carried in suspension therein and must be removed by a filter, while in the case of downward flow types of apparatus the amount of material which can be dissolved before cleaning of the apparatus becomes necessary is very limited, due to the trapping and accumulation of the impurities in the bed of the material with consequent progressive retardation of the flow of the water or other liquid through the material. It has been found, however, that if the water or other liquid first is caused to flow upwardly through a body of the material and then is caused to flow downwardly through another body of the material, most of the impurities are removed by the first body of the material and any remaining impurities in small amounts are removed by the second body of the material without either body of the material becoming rapidly clogged by the accumulation of impurities therein.

Accordingly, the present invention has more particularly in view to provide a method of and apparatus for dissolving materials involving the principle of first passing the liquid upwardly and then downwardly through separate bodies of the material, whereby a clear solution, free from impurities, may be obtained rapidly and economically without the necessity of frequently stopping operation of the apparatus for purposes of cleaning the same.

Another object of the invention is to provide an apparatus for operation in the manner stated which is of simple, inexpensive construction, which includes means whereby the impurities may be drawn off from the compartments containing the separate bodies of the material, and which further includes means for the regulation of the outflow of the solution or brine to a predetermined maximum and for the automatic control of the delivery of the solvent to the apparatus in harmony with outflow of the solution or brine therefrom.

Another object of the invention is to provide a method and apparatus for dissolving salt or other material in which the operations of sedimentation, filtration and decantation take place during dissolving of the salt or material.

With the foregoing and other objects in view, which will become more fully apparent as the nature of the invention is better understood, the same consists in the novel method of, and in the novel apparatus for, dissolving salts and other materials as will be hereinafter more fully described, illustrated in the accompanying drawing and defined in the appended claims.

In the drawing, wherein like characters of reference denote corresponding parts in the different views:—

Figure 1 is a central, vertical section through one practical form of an apparatus constructed in accordance with the invention.

Figure 2 is a top plan view of the apparatus; and

Figure 3 is a diagrammatic view illustrating the pipe connections with the apparatus.

Referring to the drawing in detail, A designates a receptacle which may be formed from any suitable material and which may be of any desired size and shape. Preferably it is in the form of a vertically disposed, vertically elongated cylinder, open at its top, or having an opening in its top, for the supply of the salt or other material thereto by any suitable means forming no part of the invention and therefore not illustrated, and closed at its bottom by a preferably conical or downwardly tapering bottom wall 10.

Dividing the receptacle A into two separate compartments a and b is a vertical partition 11 which extends from the bottom wall 10 throughout a major portion of the height of the receptacle and terminates in a horizontally disposed liquid overflow edge 12 suitably spaced downwardly from the top of the receptacle. Preferably this partition 11 is disposed to one side of the middle or axis of the receptacle so that the compartments a and b are of different sizes, the compartment b being larger than the compartment a.

Disposed above the partition 11, preferably at right angles thereto, is another vertical partition or baffle plate 13 which extends preferably to the top of the receptacle A and serves to form at the top of the receptacle a float chamber c, which may or may not be closed at its top as desired.

Suitably supported within the compartment b, preferably near the bottom thereof, is a decanting tank 15 which is open at its bottom and closed at its top and which has connected with its top portion a vent pipe 16 leading to the atmosphere and a solution or brine outflow pipe 17 having interposed therein a valve 18.

A water or other liquid supply pipe is designated as 19 and has connected therewith a pipe 20 which leads to the compartment a at a point near the bottom thereof. In the pipe 20 is a manually operable valve 21 for cutting off the supply of water or other liquid to the compartment a. Also in said pipe 20, between the valve 21 and the compartment a, is another valve 22 which is controlled by a float 23 in the float chamber c, said float operating to close said valve when the water or other liquid rises to a predetermined level in the receptacle A, and to open said valve when the liquid falls below said level.

A second pipe 24 is connected with the supply pipe 19 and has two branches 25 and 26, the former of which is connected with the bottom of the compartment a by a pipe 27 and the latter of which is connected with the bottom of the compartment b by a pipe 28. In the branch 25, one to either side of the pipe 27, is a pair of normally closed valves 29, 29, while in the branch 26, one to either side of the pipe 28, is a pair of normally closed valves 30, 30.

In the supply pipe 19 is a valve 31 whereby the supply of water or other liquid to the entire apparatus may be controlled.

In the operation of the apparatus, the salt or other material to be dissolved is supplied to the compartments a and b through their open tops either continuously or intermittently in any suitable or desired manner. At the same time, water or other liquid is supplied through the pipe 20 to the bottom of the compartment a under the control of the float operated valve 22, the amount of water or other liquid which passes through the apparatus during any given period of time being regulated by the valve 18 so as not to exceed the capacity of the apparatus.

As the water or other liquid supplied to the compartment a flows upwardly in said compartment it passes through the body of material to be dissolved which either is contained in or is flowing downwardly into said compartment. The majority of the impurities contained in the material thus are trapped and either gravitate to the bottom of the compartment a or are carried to the bottom of said compartment by the downwardly flowing material where they may be drawn off periodically through the pipe 27.

After passing upwardly through the compartment a the liquid, practically free from impurities, overflows the upper edge of the partition 11 whereby any large particles are confined to the compartment a, and enters the top of the compartment b. The liquid or partially formed solution then passes downwardly through the compartment b and through the body of salt or other material contained therein, dissolving more of the salt or material, and at the same time has any impurities contained therein filtered therefrom by the material in said compartment b. The full strength solution then enters the bottom of the decanting tank 15 and rises therein whereby any solids are separated from the brine which finally flows from said decanting tank through the outflow pipe 17, entirely clear and free from impurities.

When it becomes necessary to entirely clean the apparatus this may be done thoroughly and expeditiously by closing the valve 21; by opening the valves 29 and 30 between the pipe 24 and the pipes 27 and 28, respectively, to flush the pipes 27, 28 and to break up any bed of salt or the like which may have formed; by then closing said valves 29, 30 and opening the other valves 29 and 30 to drain the compartments a and b, and by then flushing the vent pipe 16 by means of a hose or the like which may be connected to the water supply in any desired manner. Thereafter the last mentioned valves 29 and 30 are closed to restore the apparatus to its original condition.

As is apparent, the present method and apparatus combine the advantages of both the upward and downward flow principles of dissolving salt or other material in which the operations of sedimentation, filtration and decantation take place during dissolving of the material.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. Apparatus for dissolving salt or other soluble material comprising a receptacle closed at its bottom, a substantially vertical partition dividing said receptacle into two separate compartments to receive the material to be dissolved, a liquid supply pipe connected with a bottom portion of one of said compartments, the top of said partition being disposed to have the liquid overflow from the first mentioned compartment into the other compartment, a decanting tank within the second mentioned compartment open at its bottom and closed at its top, means to vent said tank, and a solution outflow pipe connected with an upper portion of said decanting tank.

2. Apparatus for dissolving salt or other soluble material comprising a receptacle closed at its bottom, a substantially vertical partition dividing said receptacle into two separate compartments to receive the material to be dissolved, a liquid supply pipe connected with a bottom portion of one of said compartments, the top of said partition being disposed to have the liquid overflow from the first mentioned compartment into the other compartment, a valve for controlling the flow of liquid into the first mentioned compartment, float means within the receptacle controlling said valve, a baffle plate within the receptacle preventing material delivered into the tops of the compartments from interfering with said float means, and a solution outlet pipe near the bottom of the second mentioned compartment.

3. Apparatus for dissolving salt or other soluble material comprising a receptacle closed at its bottom, a substantially vertical partition dividing said receptacle into two separate compartments to receive the material to be dissolved, a liquid supply pipe connected with a bottom portion of one of said compartments, the top of said partition being disposed to have the liquid overflow from the first mentioned compartment into the other compartment, a valve for controlling the flow of liquid into the first mentioned compartment, float means within the receptacle controlling said valve, a baffle plate within the receptacle preventing material delivered into the tops of the compartments from interfering with said float means, a decanting tank within the second mentioned compartment near the bottom thereof, said tank being open at its bottom and closed at its top, means for venting said tank, and a solution outflow pipe connected with an upper part of said decanting tank.

FRANK URBANE NEAT.